United States Patent
Lamarque, III

(10) Patent No.: US 6,674,746 B1
(45) Date of Patent: Jan. 6, 2004

(54) METHOD AND APPARATUS FOR VOICE OVER INTERNET PROTOCOL SWAPPING IN A COMMUNICATIONS SYSTEM

(75) Inventor: John X. Lamarque, III, McKinney, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/359,538

(22) Filed: Jul. 22, 1999

(51) Int. Cl.[7] .............................................. H04L 12/66
(52) U.S. Cl. ...................................... 370/352; 370/466
(58) Field of Search ................................ 370/260, 352, 370/353, 354, 238, 356, 469, 466; 709/204; 379/211.02, 212.01, 218.01

(56) References Cited

U.S. PATENT DOCUMENTS

| | | | |
|---|---|---|---|
| 5,809,128 A | * | 9/1998 | McMullin ............... 379/215.01 |
| 5,889,774 A | * | 3/1999 | Mirashrafi et al. ......... 370/352 |
| 6,064,653 A | * | 5/2000 | Farris ........................ 370/237 |
| 6,134,235 A | * | 10/2000 | Goldman et al. ........... 370/352 |
| 6,324,280 B2 | * | 11/2001 | Dunn et al. ................. 379/230 |
| 6,400,817 B1 | * | 6/2002 | Su et al. ................. 379/201.05 |
| 6,421,339 B1 | * | 7/2002 | Thomas ....................... 370/352 |
| 6,445,694 B1 | * | 9/2002 | Swartz ........................ 370/352 |
| 6,449,259 B1 | * | 9/2002 | Allain et al. ................. 370/253 |

OTHER PUBLICATIONS

Kumar, Vineet, "Supplementary Services in the H.323 IP Multimedia Telephony Network," Intel Technology Journal Q3, 1999, pp. 3 and 6–8. http://www.intel.com/technology/itj/q31999/articles/art_3.htm.*

* cited by examiner

Primary Examiner—Chau Nguyen
Assistant Examiner—Nittaya Juntima

(57) ABSTRACT

A method and apparatus in a communications system for routing a call. A request is received from a user, at a first terminal, during a call to switch the call from a packet based network to a circuit switched network. Responsive to receiving the request, the call is switched to a second terminal associated with the user, wherein the second terminal uses the circuit switched network and wherein the call is switched to the second terminal without terminating the call.

25 Claims, 8 Drawing Sheets

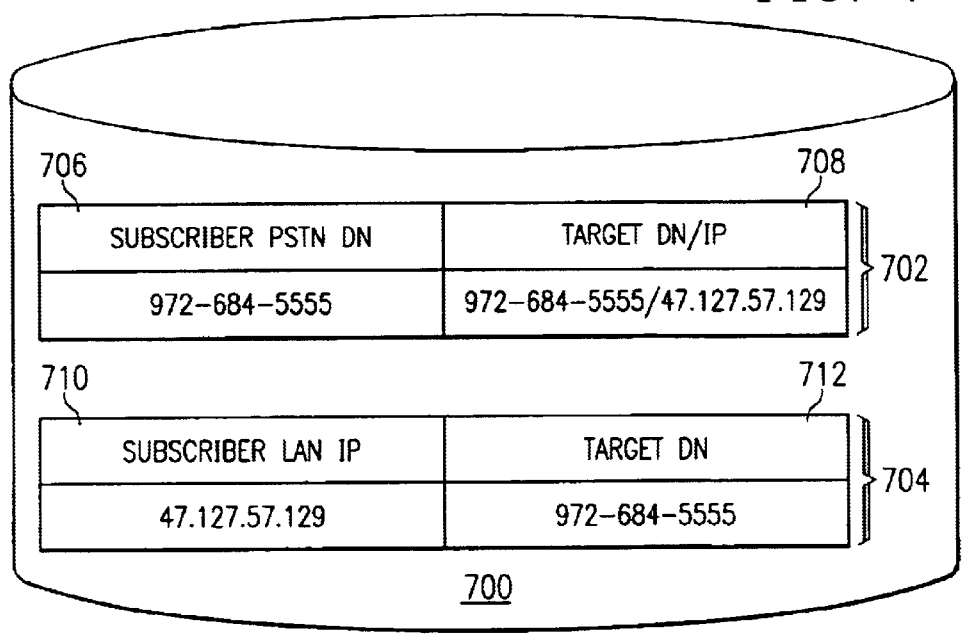
FIG. 7
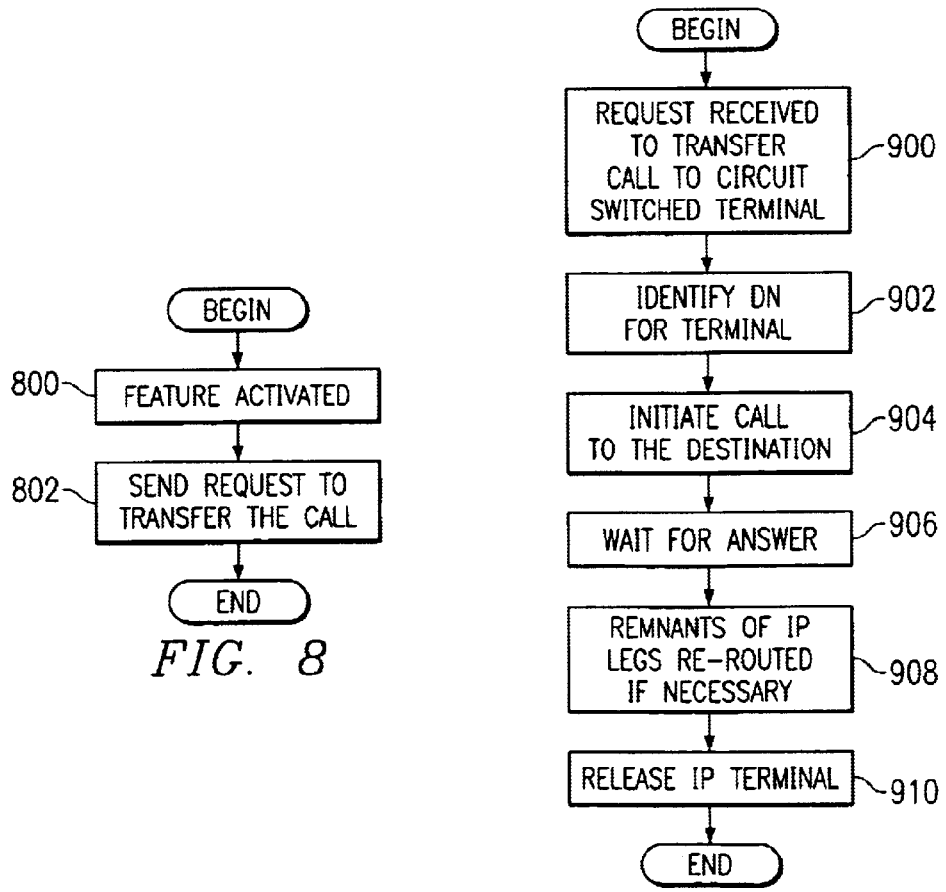
FIG. 8
FIG. 9

METHOD AND APPARATUS FOR VOICE OVER INTERNET PROTOCOL SWAPPING IN A COMMUNICATIONS SYSTEM

CROSS REFERENCE TO RELATED APPLICATIONS

The present invention is related to application entitled METHOD AND APPARATUS FOR AUTOMATIC TRANSFER OF A CALL IN A COMMUNICATIONS SYSTEM IN RESPONSE TO CHANGES IN QUALITY OF SERVICE, Ser. No. 09/358,994, filed even date hereof, and assigned to the same assignee.

1. Field of the Invention

The present invention relates generally to communications system and in particular to a method and apparatus for routing calls in a communications system. Still more particularly, the present invention relates to a method and apparatus for routing voice over Internet protocol calls within a communications system.

2. Background of the Invention

Originally regarded as a novelty, Internet telephony is attracting more and more users because it offers tremendous cost savings relative to the traditional public switch network (PSTN) users can bypass long distance carriers and their permanent usage rates and run voice traffic over the Internet for a flat monthly Internet access fee. Internet telephony involves the use of voice over Internet protocol also referred to as "voice over IP" or "VoIP". This protocol is packet based in contrast to the switch circuit system in a PSTN.

For example, user A in Austin wants to make a point-to-point phone call to user B in the company's London office. User A picks up the phone and dials an extension to connect with the gateway server, which is equipped with a telephony board and compression-conversion software ;the server configures the PBX to digitize the upcoming call. User A then dials the number of the London office, and the gateway server transmits the (digitized, IP-packetized) call over the IP-based wide area network (WAN) to the gateway at the London end. The London gateway converts the digital signal back to analog format and delivers it to the called party. With this calling system, expensive international long distance charges are virtually eliminated because the call is set up as a local call.

Users of communications system are increasingly mobile and require reliability in calls, such as, business calls. For example, user A may want to continue the conversation with the called party in London, but has to leave for an appointment. In such a situation, user A must terminate or hang up the voice over IP call and reinitiate the call on user A's mobile phone by redialing the called party's number. In another example, user A calls a party on a mobile phone while in transit to work. When user A reaches work, user A must hang up the call and redial the called party's number to start a new call, using voice over IP. In this manner, user A reduces costs for the call.

In addition, the level of reliability and sound quality expected by users is not always available with voice over IP calls. This situation is primarily caused by bandwidth limitations that lead to packet loss in the network. When congestion occurs, delays in packet transmission may occur, resulting in packets being lost or discarded. This packet loss causes gaps or periods of silence in the conversation between users. These gaps or periods of silence lead up to a "clipped-speech" effect. Such a situation is unsatisfactory for most users and is unacceptable in business communications. As a result, when a user is dissatisfied with the quality of a voice over IP call, the user must hang up the call and redial the called party's number to initiate a new call using a legacy phone to continue the conversation with the called party.

Terminating and reinitiating calls in this manner is inconvenient for a caller. As a result, a caller may often times continue a call using a legacy phone, such as a mobile phone, rather than hanging up the legacy phone and redialing the called party's number on a terminal using voice over IP. Therefore, it would be advantageous to have an improved method and apparatus for allowing a user to take advantage of voice over IP without the user having to terminate a call in progress and redial a called party's number to initiate a new call to continue the conversation.

SUMMARY OF THE INVENTION

The inconveniences to a user desiring flexibility and mobility in a communications system providing calls over a packet based network, such as voice over IP, are minimized through the method and apparatus of the present invention. A request is received from a user, at a first terminal in a communications system, during a call to switch the call from a packet based network to a circuit switched network. The call is switched to a second terminal associated with the user in response to receiving the request. The second terminal uses the circuit switched network and the call is switched to the second terminal without terminating the call.

The present invention also provides for switching from a path in a circuit switched network to a packet based network in response to a request from a user. When a request is received from a terminal during the call, the call is switched to another terminal using the packet based network.

The switching of the call between a packet based network and a circuit switched network may be accomplished by establishing a new path to a new terminal on the desired network while the path through the present network continues to be used for the call. When the new path is established, the new path is joined to the call. The portion of the current path through the current network is released or discontinued. The joining of the paths may be accomplished through a call conferencing feature used to provide call conference functions. The destination for the call may be selected by associating the user with a preselected destination stored in a database, which is queried when the user makes a request to switch or transfer the call.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is a diagram illustrating a database used in transferring calls depicted in accordance with a preferred embodiment of the present invention;

FIG. 8 is a flowchart of a process used at a terminal to transfer a call depicted in accordance with a preferred embodiment of the present invention;

FIG. 9 is a flowchart of a process for use in a transfer application located in a server or gatekeeper to transfer a call to a circuit switched network depicted in accordance with a preferred embodiment of the present invention;

DETAILED DESCRIPTION OF THE PREFERRED EMBODIMENT

Figure 1:
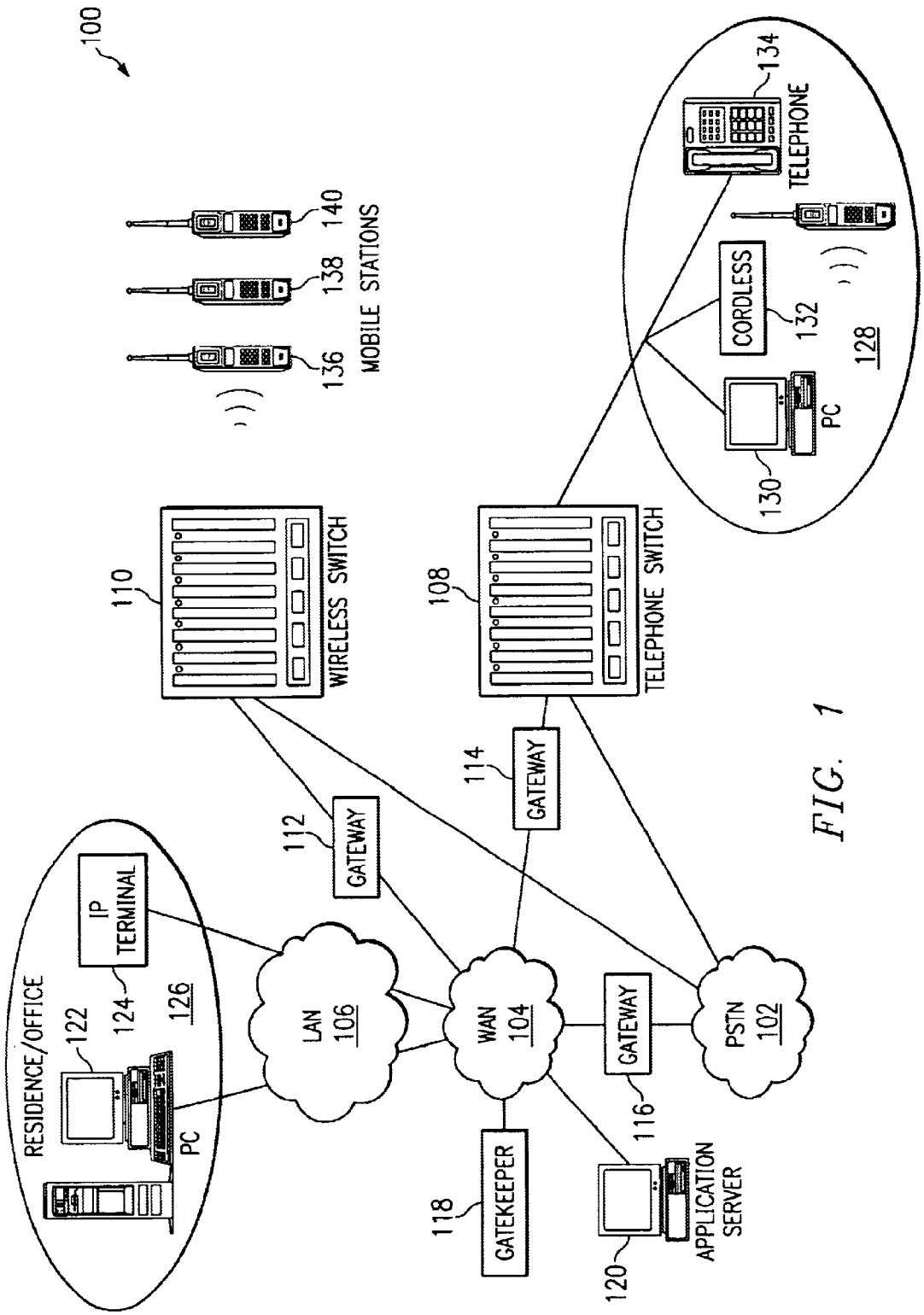
FIG. 1 is an illustration of a communications system depicted in accordance with a preferred embodiment of the present invention.

With reference now to the figures and in particular with reference to FIG. 1, an illustration of a communications system is depicted in accordance with a preferred embodiment of the present invention. Communications system 100 includes a public switch telephone network (PSTN) 102, a wide area network (WAN) 104, and a local area network (LAN) 106. Telephone switch 108 and wireless switch 110 are part of PSTN 102. PSTN 102 is a circuit switched network while WAN 104 and LAN 106 are packet-based networks. Communications system 100 also includes gateways 112–116. Gateway 112 provides an interface between WAN 104 and wireless switch 110. Gateway 114 provides an interface between WAN 104 and telephone switch 108. Gateway 116 provides an interface between switch (not shown) in PSTN 102. A gatekeeper 118 and an application server 120 are connected to WAN 104. Gateways 112–116 provide translation of calls into the appropriate protocols for use in WAN 104 and PSTN 102. Gatekeeper 118 provides network management functions in WAN 104. Application server 120 provides call functions for voice over IP calls as well as for other types of applications on WAN 104.

Terminals in the form of a personal computer (PC) 122 and an IP terminal 124 are located in location 126. In the depicted examples, location 126 may be a residence or office. PC 122 is connected to LAN 106. IP terminal 124 also is connected to LAN 106. IP terminal 124 may be, for example, a telephone configured for communication over a packet-based network (e.g. WAN 104).

Location 128 in communications system 100 includes PC 130, cordless phone 132, and telephone 134. These terminals are connected to telephone switch 108. Cordless phone 132 and telephone 134 are legacy phones. A legacy phone in the depicted examples is a conventional landline or circuit switched telephone for use with PSTN 102. Also found in communications system 100 are mobile stations 136–140. These mobile stations are legacy mobile phones, which are circuit switched terminals that communicate using switch circuit networks.

Communications system 100 as depicted in FIG. 1 is intended as an illustrative example of a communications system in which the present invention may be implemented and not as an architectural limitation. For example, WAN 104 may be placed by the Internet, which is a worldwide collection of networks. Further, Intranets also may be present within communications system 100. Of course, other elements not shown may be contained within communications system 100.

The present invention provides a method and apparatus for use in a communications system, such as communications system 100 in FIG. 1, to conveniently route calls for a user wishing to switch terminals. Specifically, the present invention allows the user to move or transfer an existing voice call back and forth from a packet based network (e.g. voice over IP network or IP network) and a switch circuit network (e.g. a legacy telephone switching system).

For example, a user may initiate a voice over IP call from a terminal, such as PC 122 at location 126. The call may be to a terminal such as, PC 130, cordless telephone 132, or telephone 134 at location 128 travels though a packet based network, LAN 106 and WAN 104 before routed through a circuit switched network, PSTN 102, to reach a terminal at location 128. If the user at PC 122 desires to leave location 126 and continue the call, the mechanism of the present invention allows the user to initiate a transfer of the call from PC 122 to another terminal, such as mobile station 136. In activating such a feature, the mechanism of the present invention may place the existing call on hold and transfer it to the appropriate mobile station. Upon answering the phone at mobile station 136, the mechanism of the present invention would allow the call to continue at mobile station 136 without requiring the user to reinitiate the call.

From a mobile station or other type of legacy telephone, a user may transfer a call from the legacy telephone to a voice over IP capable terminal to continue the call without having to redial the called party's phone number. For example, a caller on mobile station 138 initiates a call to telephone 134 at location 128 while traveling to location 126. When the user reaches location 126, the user may activate the mechanism of the present invention during a call and have the call transferred to IP terminal 124 at location 126. This transfer occurs without the user having to redial or reinitiate the call to the called party at telephone 134. By activating the mechanism of the present invention, the call is put on hold while IP terminal 124 is called. When the user answers the call at terminal 124 a transfer of the call completes.

Activation of the mechanism of the present invention occurs while the call is in progress and may be activated by a number of different ways. For example, on a legacy telephone, the mechanism may be activated by using a feature key and dialing a feature access code on a phone. On a PC, the feature may be activated by selection of an appropriate function key or icon on a graphic user interface.

Figure 2:
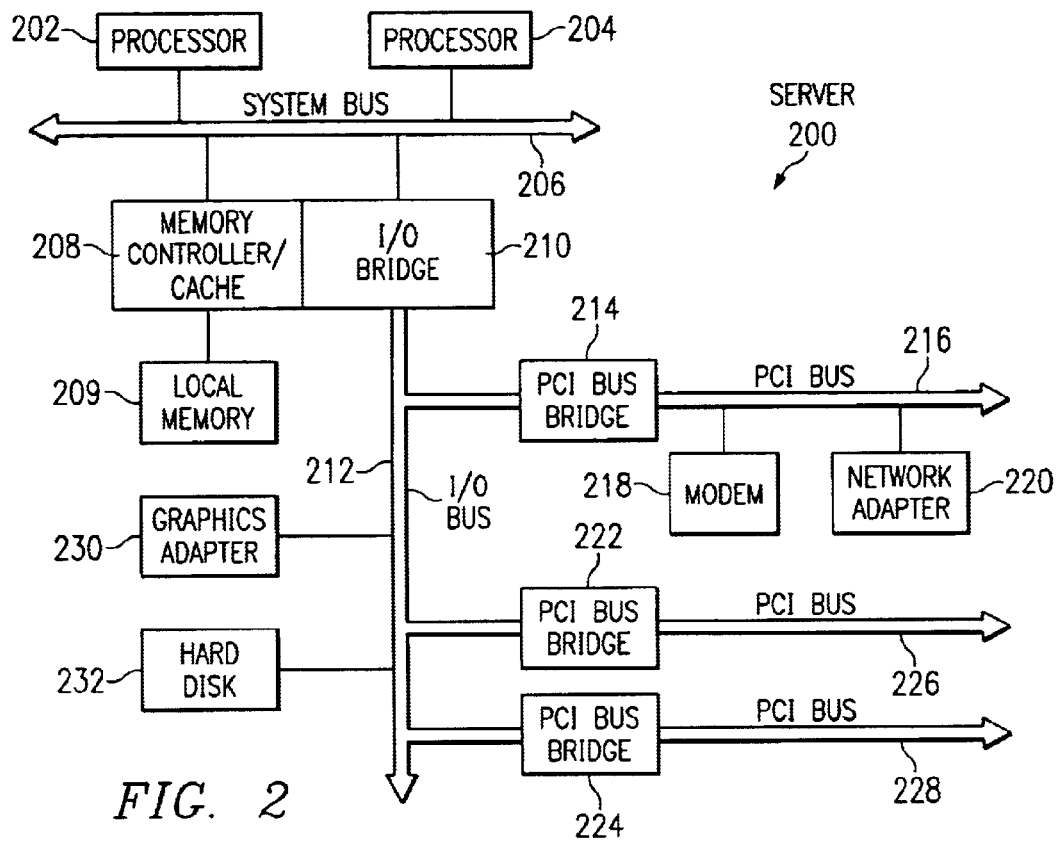
FIG. 2 is a block diagram depicting a data processing system that may be implemented as a server in accordance with a preferred embodiment of the present invention.

Referring to FIG. 2, a block diagram depicts a data processing system that may be implemented as a server in accordance with a preferred embodiment of the present invention. Data processing system 200 may be implemented as application server 120 in FIG. 1 or as a database server, such as a quality of service database server 118. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted either directly or indirectly.

Those of ordinary skill in the art will appreciate that the hardware depicted in FIG. 2 may vary. For example, other peripheral devices, such as optical disk drives and the like also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system. Furthermore, data processing system 200 may be implemented as an end user PC, such as end user PC 122 or end user PC 130. An adapter allowing a user to place voice calls would be added for use in an end user PC.

Figure 3:
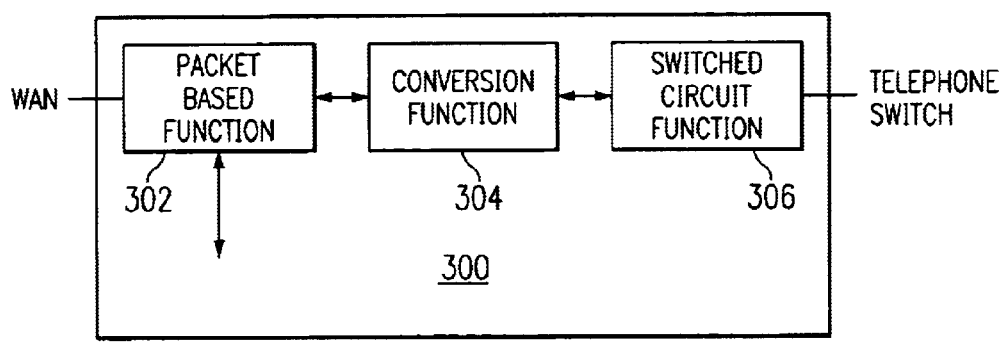
FIG. 3 is a block diagram of a gateway depicted in accordance with a preferred embodiment of the present invention.

FIGS. 3–6 are block diagrams illustrating examples of components that may be used to implement the processes of the present invention. With reference now to FIG. 3, a block diagram of a gateway is depicted in accordance with a preferred embodiment of the present invention. Gateway 300 is an example of a gateway, such as gateways 112, 114, or 116 in FIG. 1. Gateway 300 provides all of the logical and electrical translation functions required to provide communications between a packet based environment, such as WAN 104, and a circuit switched environment, such as PSTN telephone switch 110 in FIG. 1. The functions of gateway 300 are implemented along International Telecommunications Union's ITU-T Recommendation H.323, which is a standard describing systems and equipment for use in providing multi-media communications over packet based networks. Gateway 300 in FIG. 3 contains a packet-based function 302, which serves to communicate with packet based network devices. Switch circuit function 306 in gateway 300 is employed to communicate with circuit switched network devices. Conversion function 304 provides protocol conversion functions for conversion of data and other signals sent between the two environments. For example, if a voice call is flowing from a telephone switch to a WAN using gateway 300, the telephony-based traffic is compressed and placed into IP packets and routed on to the WAN.

Figure 4:
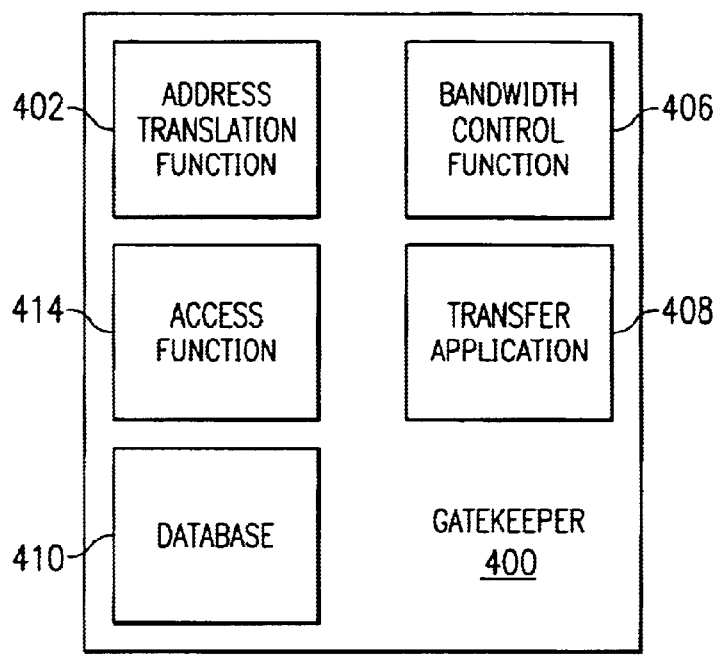
FIG. 4 is a block diagram of a gatekeeper depicted in accordance with a preferred embodiment of the present invention.

With reference now to FIG. 4, a block diagram of a gatekeeper is depicted in accordance with preferred embodiment of the present invention. Gatekeeper 400 provides network management functions. Gatekeeper 400 provides call control in routing, basic telephony services, bandwidth allocation, total network usage control, and system administration and security policies. Gatekeeper 400 contains address translation function 402, which provides address translation on a packet-based network. For example, address translation function 402 may provide a directory service allowing users to enter an alias address, which is converted into a network address for the terminal to use. The alias address may be, for example, a telephone number, an extension number, or a name. Access function 414 provides the access control used to determine whether a terminal can make or accept a call. Access function 414 is used to determine whether a terminal is allowed to access gateways to make outside calls. Bandwidth function 406 is used to determine the amount of bandwidth that is allocated for a call.

Gatekeeper 400 also includes a transfer application 408, which is used to provide the transfer functions of the present invention. In particular transfer application 408 will receive signals or requests from a user to transfer a voice over IP call using a packet-based network to a legacy telephone system call using a circuit switched network. The destination for the transferred call and information used to transfer the call is obtained from database 410 in the depicted examples.

Figure 5:
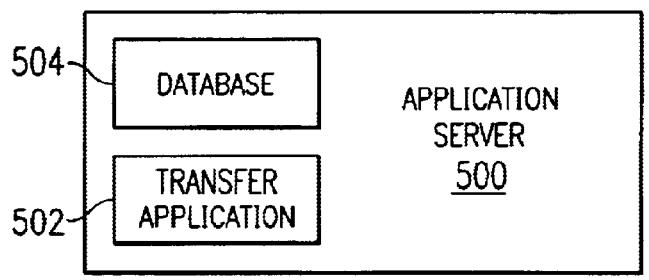
FIG. 5 is a block diagram illustrating functions in an application server depicted in accordance with a preferred embodiment of the present invention.

With reference now to FIG. 5, a block diagram illustrating functions in an application server is depicted in accordance with a preferred embodiment of the present invention. Application server 500 is an example of an application server, such as application server 120 in FIG. 1. In the depicted examples, application server 500 may include a transfer application 502 similar to transfer application 408 located within gatekeeper 400 in FIG. 4. Transfer application 502 will detect requests to transfer calls between packet-based networks and circuit switched networks. The information for identifying the destination and transferring the call is located in database 504 in applications server 500.

Figure 6:
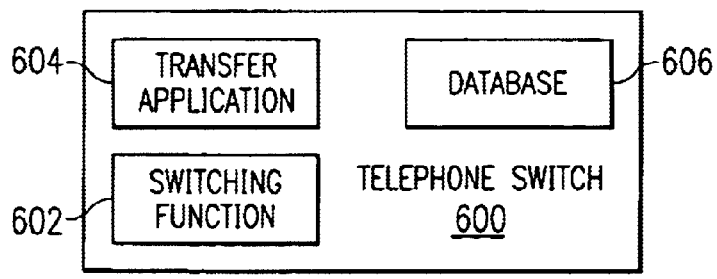
FIG. 6 is a block diagram of functions in a switch depicted in accordance with a preferred embodiment of the present invention.

Turning to FIG. 6, a block diagram of functions in a switch is depicted in accordance with a preferred embodiment of the present invention. Switch 600 may be implemented as telephone switch 108 or wireless switch 110 in FIG. 1. Switch 600 includes switching function 602, which is used to route calls. Additionally, transfer application 604 is present within switch 600. This application will transfer a call to a path through a circuit switched network in response to a signal or call from a user at a terminal to transfer the call. The information used to transfer the call is found in database 606.

With reference now to FIG. 7, a diagram illustrating a database used in transferring calls is depicted in accordance with a preferred embodiment of the present invention. Database 700 contains entries, such as entries 702 and 704, which contain information used to transfer calls between a packet based network and a circuit switched network.

Entry 702 contains an example of information used by a switch to transfer a call. Entry 702 is found in a database used by a switch, such as database 606 in FIG. 6. Entry 702 includes a subscriber PSTN directory number (DN) field 706 and a target DN/IP field 708. Subscriber PSTN DN fields 706 contains the subscribers telephone number. In this example, the number is "972-684-5555". This field is used to identify the target destination when a request is received from a user to transfer a call. The target destination is located in target DN/IP field 708. This field includes a telephone number and/or IP address of the destination. In this example, the target DN/IP is "972-684-5555/47.127.157.129". The directory number may be used by some networks to reach a terminal. In such a network, a gatekeeper provides a directory service to translate the directory number into the appropriate IP address. The IP address is the address of the terminal on the network. Other address formats may be used depending on the protocol employed. This information is used by a transfer application to forward or transfer a call to the target destination from the terminal at which the user requested the transfer.

Next, entry 704 is an example of an entry in a database found in a gatekeeper, such as database 410 in FIG. 4. Entry 704 includes a subscriber LAN IP field 710, which contains an identification of the terminal at which the user is located. The entry in this field is an IP address in the depicted examples, but may be another type of address depending on the type of protocol used on the network. In this example, the address is "47.127.57.129". Target DN field 712 contains the directory number of the target destination to which the call must be transferred if the user activates the feature. In this example, the target DN is "972-684-5555" and is directed towards a destination and a circuit switched network. Entry 704 also may be used in database 504 in application server 500 in FIG. 5.

With reference now to FIG. 8, a flowchart of a process used at a terminal to transfer a call is depicted in accordance with a preferred embodiment of the present invention. A user may desire to transfer a call from a packet-based network to a circuit switched network for various reasons. For example, if the quality of service on a packet-based network is unacceptable or the user wants more mobility, the user will use this process to transfer the call. A user may transfer a call from a circuit switched to a packet-based network for various reasons. For example, the user may desire to obtain cheaper rates for the call. Also, the user may desire to use the terminal on the packet-based network to send a data file to the called party while continuing the conversation with the call party.

The process begins by activating the feature (step 800). A user of a terminal may activate the feature in a number of ways. For example, if a user on an IP terminal wants to transfer an existing voice over IP telephone call to a traditional legacy terminal, such as a telephone, the user would depress a feature key or enter an access code to activate the transfer feature. On a legacy terminal, such as a mobile phone, a landline phone, or a cordless phone, the same type of mechanism may be used to activate the transfer feature of the present invention. Thereafter, a request is sent by the terminal to the switch to transfer the call (step 802). The request is sent to a switch, a server, or a gatekeeper in the depicted examples. A request transferring the call from a path using a packet based network to a path using a switch circuit network is sent to a switch. The request is sent to a server or gatekeeper if the requested transfer is from a circuit switched network to a packet based network.

Optionally, the user could enter a directory number or IP address for the desired destination. Such a selection of the destination may be used in place of a preselected destination for the user stored in a database.

Turning next to FIG. 9, a flowchart of a process for use in a transfer application located in a server or gatekeeper to transfer a call to a circuit switched network is depicted in accordance with a preferred embodiment of the present invention. This process is employed to transfer a call on a packet-based network to a circuit switched network.

The process begins by receiving a request to transfer the call to a circuit switched terminal on a circuit switched network (step 900). The directory number for the terminal for the user is identified by querying a database of subscribers located at the server (step 902). The IP address of the terminal originating the request for the transfer is mapped to a predefined directory number, which is accessible via the circuit switched network. Specifically, the IP address is used to locate the entry for the user. This entry is an entry, such as, for example, entry 704 in FIG. 7. The server then initiates a call to the destination selected for the user (step 904). The process then waits for an answer from the terminal at the destination (step 906). The process then reroutes any remnants of the path if needed (step 908). The process then releases the IP terminal (step 910) with the process terminating thereafter.

Figure 10:
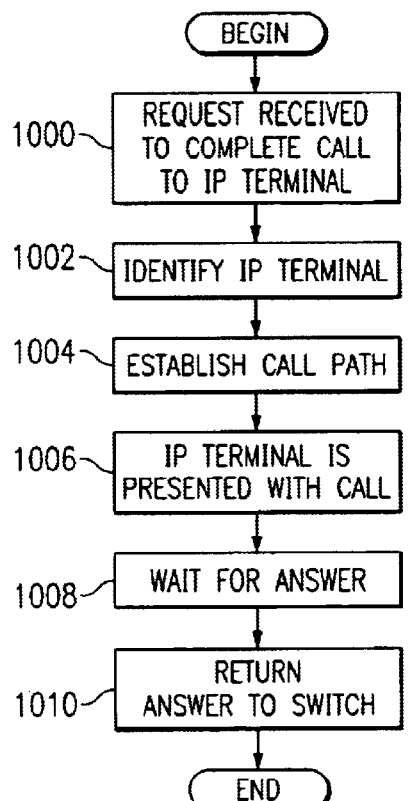
FIG. 10 is a flowchart of a process for use in a transfer application located in a server or gatekeeper to transfer a call to a packet based network depicted in accordance with a preferred embodiment of the present invention.

With reference now to FIG. 10, a flowchart of a process for use in a transfer application located in a server or gatekeeper to transfer a call to a packet based network is depicted in accordance with a preferred embodiment of the present invention. This process is used to handle a request from a switch to transfer a call to a packet-based network. The process begins by receiving a request to complete a call to an IP device (step 1000). The IP terminal to which the call is to be sent is identified (step 1002). This step is accomplished by taking the directory number from the request and mapping it to a pre-identified IP address to which the directory number is associated. The directory number may be used to identify an entry, such as entry 704 in FIG. 7. In the depicted example, the directory number is the directory number at which the user is located. Alternatively, the request could include the IP address of the user or use directory functions in the gatekeeper. Upon locating the address for the terminal, a call path is established to the terminal (step 1004). Thereafter, the IP terminal is presented with the call (step 1006). The server then waits for an answer (step 1008). When an answer occurs at the IP terminal, the answer is returned to the switch (step 1010) with the process terminating thereafter.

Figure 11:
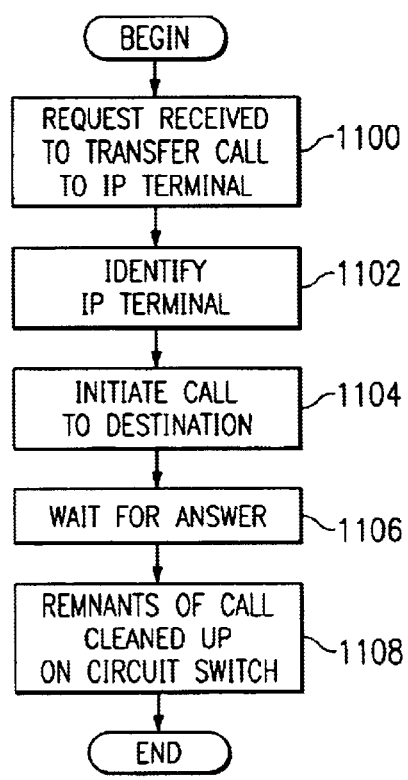
FIG. 11 is a flowchart of a process for use in a transfer application located in a switch to transfer a call to a packet based network depicted in accordance with a preferred embodiment of the present invention.

With reference next to FIG. 11, a flowchart of a process for use in a transfer application located in a switch to transfer a call to a packet based network is depicted in accordance with a preferred embodiment of the present invention. This process is employed in a transfer application, such as transfer application 604 in FIG. 6, to move or transfer an existing call from a legacy terminal on a circuit switched network to an IP terminal on a packet based network.

The process beings by receiving a request to transfer the call to an IP terminal (step 1100). The request is received from a user on a legacy terminal. Next, IP terminal for the user is identified by querying a database of subscribers located at the switch (step 1102). This query locates an entry, such as entry 702 in FIG. 7. Entry 702 provides a target DN or IP address for the terminal on the packet-based network to which the call is to be forwarded. Thereafter, the switch initiates a call to the destination identified in the entry (step 1104). The switch then waits for an answer (step 1106). When an answer is received, the switch will clean up remnants of the call (step 1108) with the process terminating thereafter. Since the path for the transferred call is optimized to not pass through the switch if the switch is not required, the switch releases all the hardware and software resources previously associated with the call. These resources include, for example, trunk circuits, PSTN telephones, and time division multiplex (TDM) network connections and/or paths.

Figure 12:
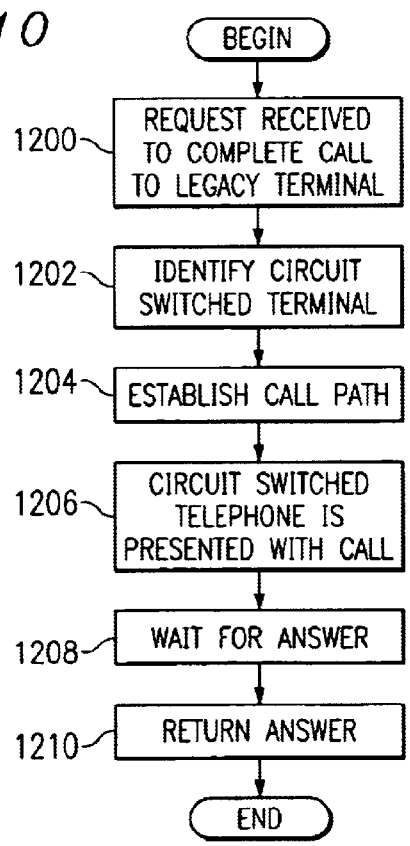
FIG. 12 is a flowchart of a process for use in a transfer application located in a switch to transfer a call to a circuit switched network depicted in accordance with a preferred embodiment of the present invention.

With reference now to FIG. 12, a flowchart of a process for use in a transfer application located in a switch to transfer a call to a circuit switched network is depicted in accordance with a preferred embodiment of the present invention. This process is initiated in response to a request from a server in a packet-based network to transfer a call to a legacy terminal in a circuit switched network.

The process begins by receiving a request to complete a call to a circuit switched terminal (step 1200). The circuit switched terminal to which the call is to be sent is identified (step 1202). This step is accomplished by taking the IP address from the request and mapping it to a pre-identified directory number to which the IP address is associated. Upon locating the directory number for the terminal, a call path is established to the terminal (step 1204). Thereafter, the circuit switched terminal is presented with the call (step 1206). The switch then waits for an answer (step 1208). When an answer occurs at the circuit switched terminal, the answer is returned to the server (step 1210) with the process terminating thereafter.

The message flow diagrams described below in FIGS. 13–16 illustrate examples of the present invention. The diagrams are described with respect to a packet-based network in the form of an IP network and with respect to a circuit switched network in the form of a PSTN using time division multiplexing (TDM). These flows can be applied to other types of networks other than the ones described. For example, without limitation, packet based networks, such a frame relay and asynchronous transfer mode (ATM) networks also may used.

Figure 13:
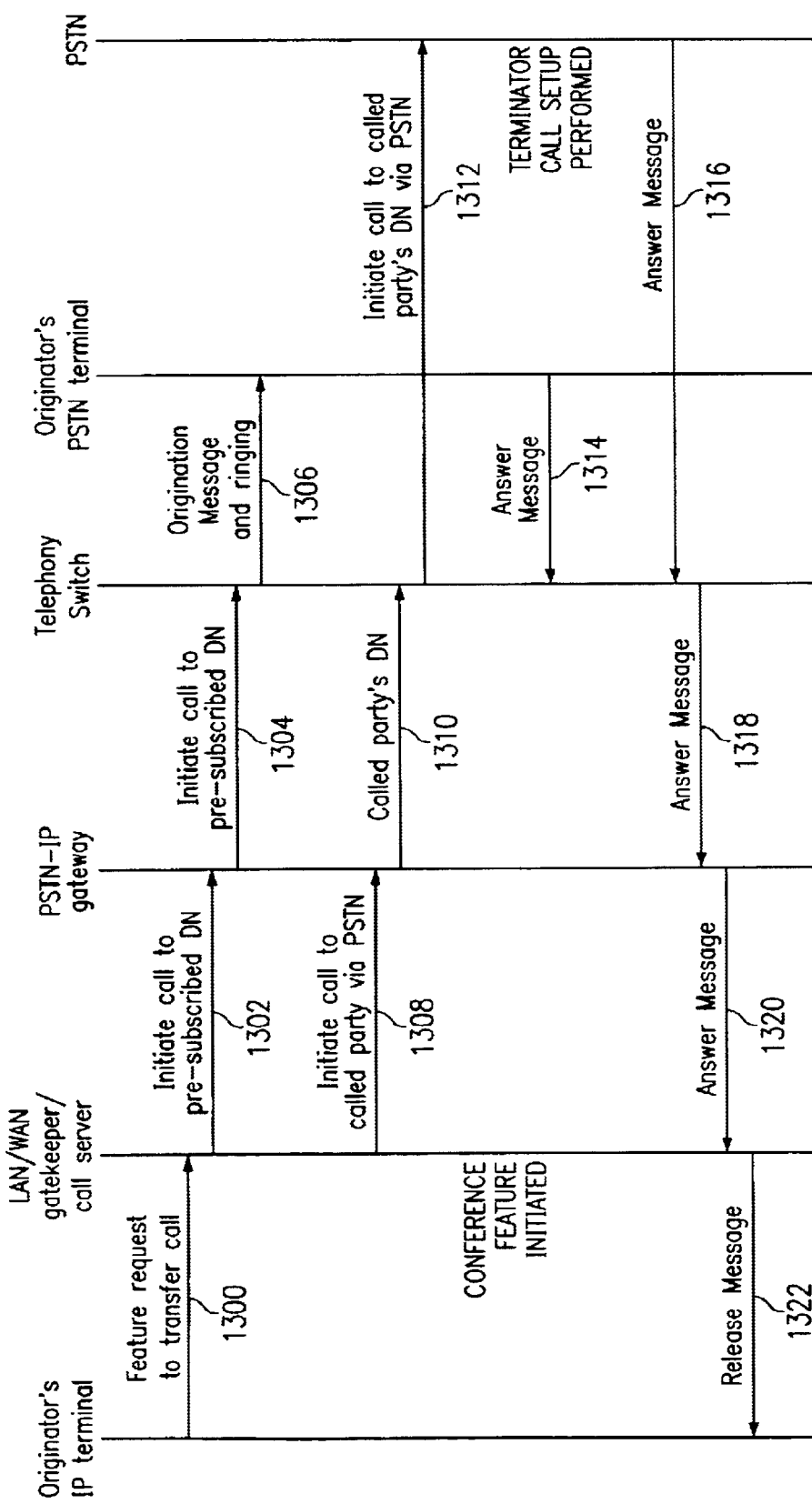
FIG. 13 is a message flow diagram of a process used to transfer a call from an IP network to a PSTN depicted in accordance with a preferred embodiment of the present invention.

Turning now to FIG. 13, a message flow diagram of a process used to transfer a call from an IP network to a PSTN is depicted in accordance with a preferred embodiment of the present invention. This message flow diagram illustrates the sequence of messages occurring when a user originating a call requests the call to be transferred. A request is received by a gatekeeper or other call server from an IP terminal on an IP network to transfer the call from the IP network to the PSTN (step 1300). This terminal is the originator's IP terminal. In response, the gatekeeper sends a message to a gateway to initiate a call to a pre-subscribed directory number (step 1302). The gateway forwards this message to a telephone switch, which is also referred to as a "first switch" in these examples (step 1304). The switch uses the directory number to send an origination message to the PSTN terminal identified using the directory number and to cause the terminal to ring (step 1306). The gatekeeper also sends a request to the gateway to initiate a call to the called party's directory number (step 1308). The gateway sends the called party's called directory number to a second switch (step 1310). This switch initiates a call to the called party's directory number through the PSTN (step 1312). An answer message is from originator's terminal on the PSTN (step 1314). This occurs when the user picks up or answers the PSTN telephone. An answer is received from the PSTN when a new path is established by the second switch to the called party's terminal (step 1316). Steps 1312–1316 involve the use of existing conference features to put the calls together. The steps involve the use of a conference bridge located in the second switch. The answers are returned in a message from the switch to the gateway (step 1318). The gateway relays the message to the gatekeeper (step 1320). In response, the gatekeeper sends a release message to the IP terminal to release the IP terminal from the call (step 1322).

Figure 14:
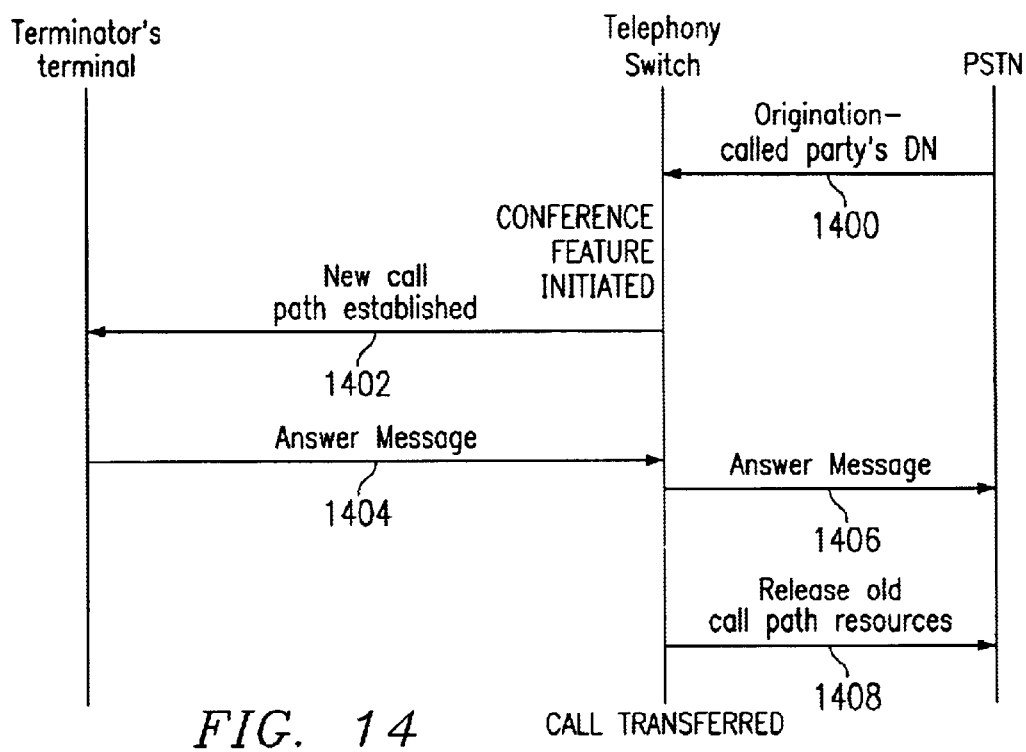
FIG. 14 is a message flow diagram of a process for transferring a call from an IP network to a PSTN depicted in accordance with a preferred embodiment of the present invention.

In FIG. 14, a message flow diagram of a process for transferring a call from an IP network to a PSTN is depicted in accordance with a preferred embodiment of the present invention. This flow is from the perspective of the second switch described in FIG. 13.

A message is received by the switch from first switch in the PSTN with a party's directory number (step 1400). A conference feature is initiated by the switch using a conference bridge in the switch. A new call is established to the terminator's terminal (step 1402). At this time a path is present from the switch to the called parties terminal to first port in the conference bridge. A second path is present from the original IP based call from the originating IP terminal to a second port in the conference bridge. Another path is present that leads from a third port in the conference bridge to the originator's PSTN telephone. The conference port will put the paths together to "conference" the call. An answer is received by the switch from the called party's terminal (step 1404). The called party need not take any action in this case. The answer is an acknowledgement that the path is present. The party will hang up or terminate the call from the IP terminal or the gatekeeper can drop the call to the IP terminal. At that time, the switch will release the port to the IP terminal and the call on the other two ports will continue.

Thereafter, the switch sends the answer message to the first switch in the PSTN (step 1406). The switch also releases the resources in the old call path by sending a request to the first switch in the PSTN (step 1408). At this time the call has been successfully transferred.

Figure 15:
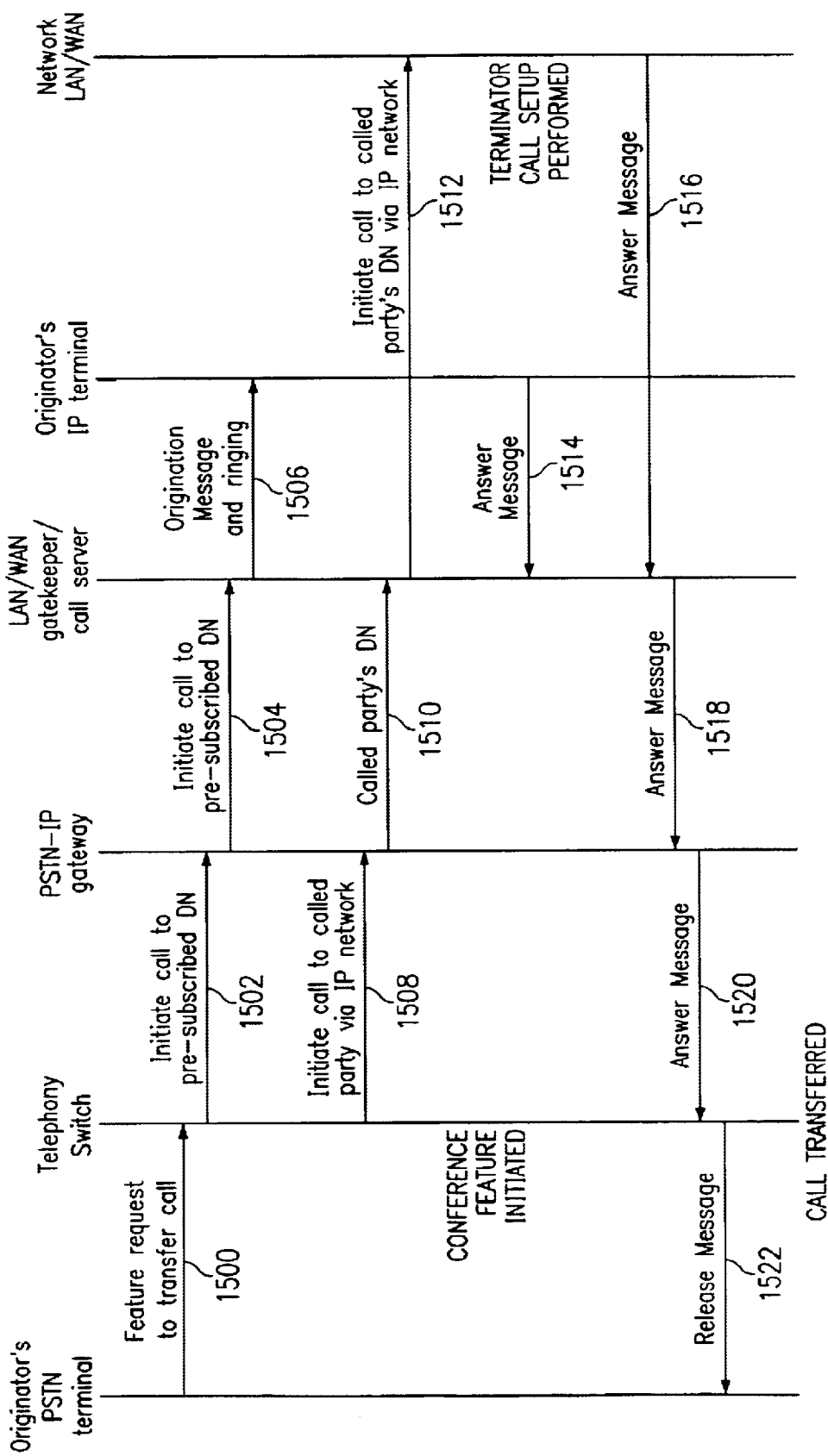
FIG. 15 is a message flow diagram of a process for transferring a call from a PSTN to an IP network depicted in accordance with a preferred embodiment of the present invention.

With reference to FIG. 15, a message flow diagram of a process for transferring a call from a PSTN to an IP network is depicted in accordance with a preferred embodiment of the present invention. A request is received from an PSTN terminal by a switch to transfer the call to an IP network (step 1500). In response, the switch sends a message to a gateway to initiate a call to a pre-subscribed directory number (step 1502). The gateway sends the request to a gatekeeper or other application server on the IP network (step 1504). Thereafter, an origination message is sent to the originator's IP terminal and the IP terminal rings or indicates a call is present to be answered (step 1506). The switch also sends a request to the gateway to initiate a call to the called party through the IP network (step 1508). The gateway also will send the called party's directory number from the request to the gatekeeper (step 1510). The gatekeeper then initiates a call to the called party's directory number to the IP network (step 1512). An answer is received from the originator's IP terminal (step 1514). An answer also is received from the packet-based network (step 1516). Steps 1512–1516 are steps used in conference call functions to join calls as described above.

An answer message is received by the server to the gateway in response to the gatekeeper receiving the answers from the two terminals (step 1518). The message is relayed by the gateway to the switch (step 1520). In turn, the switch will send a release message to the originator's PSTN terminal (step 1522).

Figure 16:
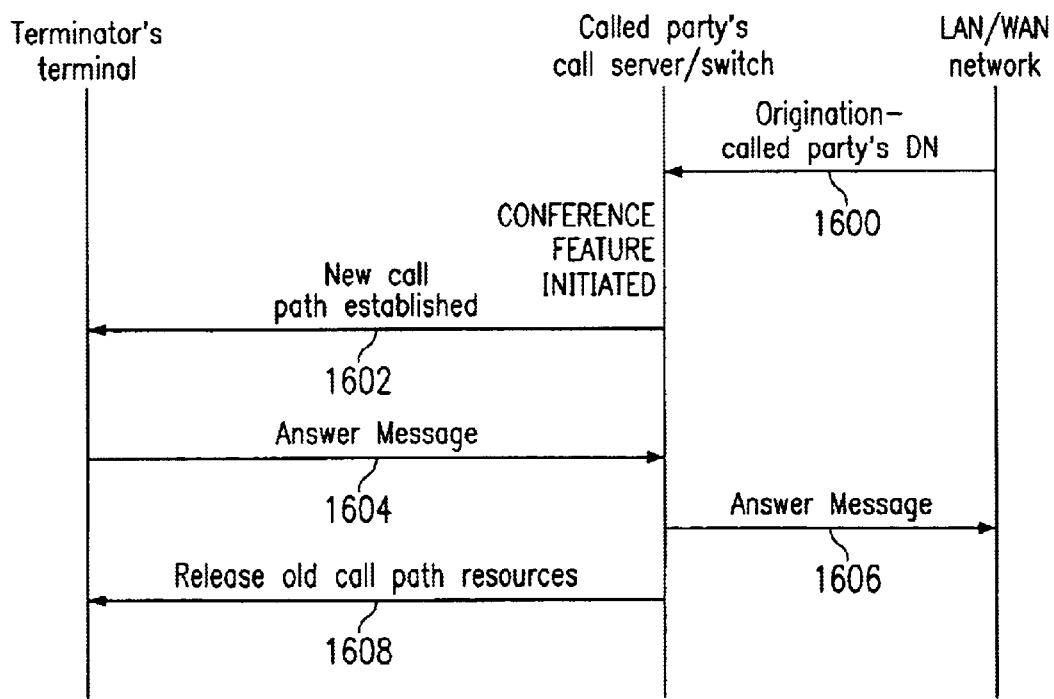
FIG. 16 is a message flow diagram of a process used to transfer a call from a PSTN to an IP network depicted in accordance with a preferred embodiment of the present invention.

Next, FIG. 16 is a message flow diagram of a process used to transfer a call from a PSTN to an IP network is depicted in accordance with a preferred embodiment of the present invention. A message is received by a switch from the WAN in the IP network with a called parties directory number (step 1600). A conference call feature is initiated by the switch. A new call path is established by the switch to the terminator's terminal (step 1602). An answer message is returned by the terminator's terminal to the switch (step 1604). The answer message is sent by the switch to the network (step 1606). In response, the switch will send a message to release old call path resources (step 1608). At this point, the call has been transferred.

Thus, the present invention provides an improved method an apparatus for transferring calls without the user having to hang up or terminate a call at the terminal and reinitiate the call at a desired terminal. The present invention provides this advantage by allowing the call to be automatically transferred in response to an activation of a feature. The call is transferred to a pre-selected destination at which the user desires to continue the call. In this manner, a user may switch the path of a call in progress back and forth between a packet-based network and a circuit switched network.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The various illustrated components used in transferring calls may be placed in different locations in the communications system other than those in the depicted examples. For example, the transfer application is illustrated as being located in an application server or gatekeeper in a packet based network in the examples. The transfer application may be located in other places within a packet-based network, such as a call server. Some of the processes in the transfer application may be split out. For example, the directory translation may be performed at a terminal in which the terminal provides the directory number of the target. Although the depicted examples involve voice over IP, the processes may be applied to other packet-based protocols. Further, although the examples used a conferencing mechanism to make the transfer, other mechanism may be used. For example, the call between the parties could be put on hold such that the called party hears nothing or music on hold momentarily until the caller picks up at the terminal to which the call was transferred.

The embodiment described was chosen and described in order to best explain the principles of the invention, the practical application, and to enable others of ordinary skill in the art to understand the invention for various embodiments with various modifications as are suited to the particular use contemplated.

What is claimed is:

1. A method in a communications system for routing a call, the method comprising:

receiving a request from a user, at a first terminal, during a call to switch the call from a packet based network to a circuit switched network; and responsive to receiving the request, switching the call to a second terminal associated with the user, wherein the second terminal uses the circuit switched network and wherein the call is switched to the second terminal without terminating the call;

wherein the step of switching comprises:

creating a path from the second terminal on the circuit switched network to a destination terminal; and continuing the call using the path on the circuit switched network.

2. A method in a communications system for routing a call, the method comprising:

receiving a request from a user, at a first terminal, during a call to switch the call from a packet based network to a circuit switched network; and responsive to receiving the request, switching the call to a second terminal associated with the user, wherein the second terminal uses the circuit switched network and wherein the call is switched to the second terminal without terminating the call;

establishing a path from the second terminal on the circuit switched network to the destination terminal; and responsive to an answer at the second terminal, using the path to continue the call without interruption.

3. A method in a communications system for routing a call, the method comprising:

receiving a request from a user, at a first terminal, during a call to switch the call from a packet based network to a circuit switched network; and responsive to receiving the request, switching the call to a second terminal associated with the user, wherein the second terminal uses the circuit switched network and wherein the call is switched to the second terminal without terminating the call;

wherein the first terminal has a first path to a switching node and a second path from the switching node to a destination node and wherein the step of switching comprises:

creating a third path to the second terminal on the circuit switched network; and joining the third path to the second path, wherein the second terminal is joined into the call.

4. The method of claim 3 further comprising:

joining the third path to the first path, wherein the second terminal is joined into a conference call.

5. The method of claim 4, wherein the first path, the second path, and the third path are joined at a conference bridge in the switching node.

6. A method in a communications system for routing a call, the method comprising:

receiving a request from a user, at a first terminal, during a call to switch the call from a packet based network to a circuit switched network; and responsive to receiving the request, switching the call to a second terminal associated with the user, wherein the second terminal uses the circuit switched network and wherein the call is switched to the second terminal without terminating the call;

wherein the second terminal is associated with the user in a database; and wherein the database is located in a switch.

7. A method in a communications system for routing a call, the method comprising:

receiving a request from a user, at a first terminal, during a call to switch the call from a circuit switched network to a packet based network; and responsive to receiving the request, switching the call to a second terminal associated with the user, wherein the second terminal uses the packet based network and wherein the call is switched to the second terminal without terminating the call.

8. The method of claim 7, wherein the step of initiating comprises:

establishing a path to the second terminal on the packet based network; and responsive to an answer at the second terminal, using the path to continue the call without interruption.

9. A communications system comprising:

a circuit switched network;

a packet based network;

a first terminal connected to the packet based network;

a second terminal connected to the circuit switched network;

a switch connected to the circuit switched network and the packet switched network, wherein the switch has a plurality of modes of operations including:

a first mode of operation, responsive to receiving a request to switch a request from the first terminal to switch to an active call between the first terminal and a destination terminal from the packet based network to the circuit switched network, in which the switch establishes a first path to the second terminal; and a second mode of operation, responsive to establishing the first path, in which the switch joins the first path to a second path to the first terminal and to a third path to the destination terminal.

10. The communications system of claim 9, wherein the switch joins the first path to the second path and the third path using a conference bridge.

11. The communications system of claim 9, wherein the second terminal is a wireless telephone.

12. A switch comprising:

a plurality of communications ports;

a switch fabric connected to the plurality of communications ports; and a processing unit, wherein the processing unit controls routing of calls through the switch fabric;

wherein the processing unit, responsive to receiving a request from a first terminal in communication with the switch through a first path using a packet based network to move a call in progress to a circuit switched network, establishes a second path to a second terminal associated with a user and joins the second path to the call in progress, wherein the second terminal is used to continue the call in progress; and wherein the processing unit sends a message to release at least a portion of the first path using the packet based network such that the second path and any remaining portion of the first path use the circuit switched network.

13. A computer comprising:

a communications unit, wherein the communications units handles receiving and transmitting packets in a packet based network; and a processing unit, wherein the processing unit routes packets received by the communications unit and wherein responsive to receiving a request from a terminal handling a voice call in progress to reroute the voice call in progress to a circuit switched network, the processing unit sends a request to a circuit switched network to reroute the call through the circuit switched network.

14. The computer of claim 13, wherein the processing unit routing releases the terminal in response to receiving an indication that a path has been established through the circuit switched network.

15. The computer of claim 13, wherein the indication is an answer message received from the circuit switched network.

16. The computer of claim 13, wherein the computer is gatekeeper.

17. The computer of claim 13, wherein the computer is a call server.

18. A communications system for routing a call, the communications system comprising:

receiving means for receiving a request from a user, at a first terminal, during a call to switch the call from a packet based network to a circuit switched network; and switching means, responsive to receiving the request, for switching the call to a second terminal associated with the user, wherein the second terminal uses the circuit switched network and wherein the call is switched to the second terminal without terminating the call;

wherein the switching means comprises:

creating means for creating a path from the second terminal on the circuit switched network to a destination terminal; and continuing means for continuing the call using the path on the circuit switched network.

19. A communications system for routing a call, the communications system comprising:

receiving means for receiving a request from a user, at a first terminal, during a call to switch the call from a packet based network to a circuit switched network; and switching means, responsive to receiving the request, for switching the call to a second terminal associated with the user, wherein the second terminal uses the circuit switched network and wherein the call is switched to the second terminal without terminating the call;

establishing means for establishing a path from the second terminal on the circuit switched network to the destination terminal; and using means, responsive to an answer at the second terminal, for using the path to continue the call without interruption.

20. A communications system for routing a call, the communications system comprising:

receiving means for receiving a request from a user, at a first terminal, during a call to switch the call from a packet based network to a circuit switched network; and switching means, responsive to receiving the request, for switching the call to a second terminal associated with the user, wherein the second terminal uses the circuit switched network and wherein the call is switched to the second terminal without terminating the call;

wherein the first terminal has a first path to a switching node and a second path from the switching node to a destination node and wherein the switching means comprises:

creating means for creating a third path to the second terminal on the circuit switched network; and joining means for joining the third path to the second path, wherein the second terminal is joined into the call.

21. The communications system of claim 20 further comprising:

joining means for joining the third path to the first path, wherein the second terminal is joined into a conference call.

22. The communications system of claim 21, wherein the first path, the second path, and the third path are joined at a conference bridge in the switching node.

23. A communications system for routing a call, the communications system comprising:

receiving means for receiving a request from a user, at a first terminal, during a call to switch the call from a circuit switched network to a packet based network; and switching means, responsive to receiving the request, for switching the call to a second terminal associated with the user, wherein the second terminal uses the packet based network and wherein the call is switched to the second terminal without terminating the call.

24. The communications system of claim 23, wherein the initiating means comprises:

establishing means for establishing a path to the second terminal on the packet based network; and using means, responsive to an answer at the second terminal, for using the path to continue the call without interruption.

25. A computer program product in a computer readable medium for routing a call, the computer program product comprising:

first instructions for receiving a request from a user, at a first terminal, during a call to switch the call from a circuit switched network to a packet based network; and second instructions, responsive to receiving the request, for switching the call to a second terminal associated with the user, wherein the second terminal uses the packet based network and wherein the call is switched to the second terminal without terminating the call.

* * * * *